United States Patent

Wong et al.

[11] Patent Number: 5,937,394
[45] Date of Patent: Aug. 10, 1999

[54] SYSTEM AND METHOD FOR PSEUDO CASH TRANSACTIONS WITH CREDIT BACK

[75] Inventors: Jacob Y. Wong, Goleta; Roy L. Anderson, Glendale, both of Calif.

[73] Assignee: Jaesent, Inc., Goleta, Calif.

[21] Appl. No.: 08/971,416

[22] Filed: Nov. 17, 1997

Related U.S. Application Data

[63] Continuation-in-part of application No. 08/720,785, Oct. 3, 1996.

[51] Int. Cl.[6] .................................................... G06F 17/60

[52] U.S. Cl. ................................. 705/26; 705/35; 705/38; 705/39

[58] Field of Search .................................. 705/26, 27, 38, 705/35, 39, 40, 41, 42, 43, 44; 235/380, 382, 382.5; 380/23, 24, 25, 4

[56] References Cited

U.S. PATENT DOCUMENTS

| | | | |
|---|---|---|---|
| 4,016,405 | 4/1977 | McCune et al. | 235/380 |
| 4,234,932 | 11/1980 | Gorgens | 235/379 |
| 4,390,968 | 6/1983 | Hennessy et al. | 380/24 |
| 4,438,326 | 3/1984 | Uchida | 705/43 |
| 4,650,978 | 3/1987 | Hudson et al. | 235/380 |
| 4,755,940 | 7/1988 | Brachtl et al. | 705/44 |
| 5,220,501 | 6/1993 | Lawlor et al. | 380/24 |
| 5,371,797 | 12/1994 | Bocinsky, Jr. | 380/24 |
| 5,455,407 | 10/1995 | Rosen | 380/24 |

*Primary Examiner*—Allen R. MacDonald
*Assistant Examiner*—Romain Jeanty
*Attorney, Agent, or Firm*—Lyon & Lyon LLP

[57] ABSTRACT

A system and method for pseudo cash transactions allows a portion of the pseudo cash to be refunded through use of a credit back indicator which is used by a record adjuster to adjust the file associated with a pseudo cash unit which can then be accessed by the user with a user identifier to obtain a refund or credit.

9 Claims, 1 Drawing Sheet

5,937,394

SYSTEM AND METHOD FOR PSEUDO CASH TRANSACTIONS WITH CREDIT BACK

CROSS-REFERENCE TO RELATED APPLICATIONS

This present application is a continuation-in-part of U.S. application Ser. No. 08/720,785 filed on Oct. 3, 1996 for SYSTEM AND METHOD FOR PSEUDO CASH TRANSACTIONS. The disclosure of that application is specifically incorporated herein by reference.

FIELD OF THE INVENTION

The present invention is in the field of electronic money/Internet payment systems.

BACKGROUND OF THE INVENTION

As the Internet continues to transform commerce as we know it, method of payment is one component that is critical to successfully conducting business across a network. Today shoppers purchasing goods or services on the Internet are required to give their credit card numbers, phone numbers and/or addresses over the Internet in order to complete their transactions. The problem is that they do not know who else might be able to retrieve this information without their knowledge or consent. No doubt people are still very enthusiastic about the idea of Internet commerce. However, they are much more reserved in believing its potential, all because of the issues of privacy and potential credit liability not being fully resolved and protected in shopping on the internet at the present time.

U.S. application Ser. No. 08/720,785 filed on Oct. 3, 1996 for SYSTEM AND METHOD FOR PSEUDO CASH TRANSACTIONS cited and reviewed five electronic payment systems for use on the Internet, viz. First Virtual, Cybercash, Netbill, Millicent and Digicash or ecash. The conclusion was that no satisfactory systems and/or procedures for electronic money/Internet payment existed. However, since personal privacy and credit liability will no doubt continue to be issues of great importance for potential Internet users, commerce on the Internet simply cannot flourish without a cash dispensing system that not only guarantees these features, but also others that take advantage of the simplicity and convenience of buying and selling on the Internet.

In order to fill such an urgent need, a novel system and method for pseudo cash transactions was advanced in U.S. application Ser. No. 08/720,785. Through this system, totally anonymous or effectively anonymous cash-like transactions are accomplished by using a pseudo cash data packet converter for inserting a user key into a pseudo cash preliminary data packet through the use of a user insertion key to generate a pseudo cash unit with a fixed monetary value that can be used to purchase goods or services via the Internet. A pseudo cash repository facilitates the cash the cash-like transactions and maintains a record of the pseudo cash units and their fixed monetary value. Depending upon the level of anonymity selected by a purchaser, the pseudo cash repository can either transmit pseudo cash preliminary data packets or pseudo cash units to a first entity. If the first entity loses an effectively anonymous pseudo cash preliminary data packet, it can be replaced by the pseudo cash repository.

Since the filing date of the aforementioned U.S. application Ser. No. 08/720,785, viz. Oct. 3, 1996, additional electronic payment systems for the Internet have been advanced (see for example, *Electronic Payment Systems,* by Donald O'Mahoney et al., ISBN: 0-89006-925-5, and published by ARTECH HOUSE PUBLISHERS, 1997). Not necessary in chronological order or in completeness, some of these important systems are listed and reviewed as follows.

Magic Money is a system proposed for the implementation of fully anonymous digital cash using blind signatures. It has many similarities with the Digicash or Ecash system cited earlier in the application Ser. No. 08/720,785, and was designed for experimental purposes by a group of cryptographic enthusiasts, know as cypherpunks, on the Internet. The source code is available in computer software language C and there is an example client program that can automatically accept and pay out Magic Money currency. This system is set up purposely to be rather complex and the users are required to have extensive knowledge in computer software before they can use the system efficiently.

Project CAFÉ is an advanced electronic payment system developed as the result of a project funded by the European Community and started in 1992. CAFÉ is a hybrid scheme in the sense that it offers all the benefits of anonymous electronic cash but at the same time lets the user sign checks up to a specified amount. It is an advanced payment mechanism that makes use of secure tamper-resistant devices such as smart cards and strong cryptograhic protocols. It also provides untraceable electronic payments and guarantees the security of all parties concerned. However, this advanced electronic payment system is necessarily a very complex system involving the cooperation and participation of many willing players and hence not especially efficient and simple for use in the Internet by the general public.

NetCash is an identified online electronic cash system, for open networks. It consists of distributed currency users that mint electronic coins and issue them to the users of the system, accepting electronic checks in payment for them. The system is online in that each coin must be verified as being valid and unspent by forwarding it to the minting currency server for verification during a purchase. Although the digital cash is identified, with each coin having a unique serial number, there is an exchange mechanism to provide limited anonymity. Anyone with valid coins can exchange them anonymously with a currency server for new ones.

NetCash is a macropayment system suitable for selling hard goods, information, or other network services. Users can both make and accept payments. It is a software-only solution, requiring no special hardware. Both asymmetric and symmetric cryptography are used to provide the network security of the system and to limit fraud. Unfortunately, like the previously cited electronic cash payment systems, it encompasses too many facets of application and is certainly more complex than is needed for doing simple commerce electronic transactions on the Internet.

Both Mondex and EMV Cash Card are electronic cash card or prepayment card systems to effect payment in the retail context. Their scheme involves preloading a chip card with value that could then be spent at retail outlets. As such, this electronic cash systems, without a major structural redesign, is not suitable for use with the Internet.

Besides electronic cash payment systems alluded to above, there are also credit card-based systems such as MOTO (Mail order/telephone order transactions). Unsecured network payments, First Virtual (cited earlier in application Ser. No. 08/720,785), CARI (Collect all relevant information), SSL (secure socket layer) and SET(Secure Electronic Transactions). All of these credit card-based payment systems use sophisticated software packages, secure tamper-resistant hardware devices and strong cryptographic protocols involving the users, the merchants and the issuing money sources.

There are two fundamental characteristics that are common to all electronic card payment and credit card-based payment systems today. First, security and privacy of vital personal information that is transmitted over the Internet are always entrusted by the user to the money source such as the bank, credit card company etc. In other words, the user gives out the vital personal information directly on the Internet and relies solely on embedded software at his or her computer (supplied in many cases by the money source) or the server of the money source for encryption of such information before it appears publicly on the Internet. Thus it depends on how secured the individual user feels before he or she is willing to give out their vital personal information, irrespective of what electronic cash or credit card-based systems that he or she uses. Sometimes even an iron-clad guarantee by these electronic cash or credit card-based system sponsors may not be good enough to influence an individual user's decision to conduct or not to conduct commerce on the Internet using either some form of digital cash or credit cards. In fact, as alluded to earlier, until such time that a simple electronic cash system, trusted absolutely 100% by the users on the Internet, becomes available, security of privacy remains as the single most important issue that will stymie the future growth of commerce on the Internet.

Second, transactions on the Internet for practically all electronic cash or credit-card-based systems of today invariably involve a three-way interaction, namely among the user, the merchant and the money source. This characteristic or feature of present day systems not only requires the system structure to be necessarily more complex, it also generally takes more time and is more costly for transactions to take place on the Internet.

The novel system for processing electronic cash transactions anonymously (or code-named SPECTA) on the Internet, as advanced in U.S. application Ser. No. 08/720,785 filed on Oct. 3, 1996, significantly reduces the role of merchants in any Internet commerce transaction to just verifying the validity of the digital cash tendered or the user's credit card (to be discussed below). It also simplifies any transaction on the Internet from a three-party interaction to that of only two. Furthermore, the SPECTA system allows the user to encrypt very simply his or her vital personal information (such as digital cash, name and address, telephone or credit card numbers etc.) himself or herself, before placing such information on the Internet. This feature might appear to be routine and superficial on the surface. However, from the security standpoint, it is extremely important. The reason is that by having the user encrypt just his or her own vital information on the Internet, it eliminates the desire for any pirate to decode such information. Contrary to cracking the encryption code of a money source, which could lead to a wealth of vital information that possesses monetary value, there is simply not enough monetary inventive to crack just one or two individual users' encryption codes on the Internet. Thus the SPECTA system by design offers a much stronger security to safeguard the privacy of personal information for users on the Internet.

It is an object of the present invention to extend the SPECTA electronic cash transaction system, which was filed as U.S. application Ser. No. 08/720,785 on Oct. 3, 1996 for SYSTEM AND METHOD FOR PSEUDO CASH TRANSACTIONS, by enabling holders of pseudo cash to recover from the Money Source the difference between the face value of pseudo cash tendered to the merchant and an amount less than the face value, to thereby allow the holder to receive credit back (or change) from the Money Source.

SUMMARY OF THE INVENTION

The present invention is generally directed to electronic money/Internet payment systems that insert a user key into a string of data in accordance with a user insertion key through use of an algorithm to generate pseudo electronic cash so customers and vendors can buy and sell merchandise and information on the Internet in a manner resembling various degrees of real-life cash transactions.

In a first, separate aspect of the present invention, a credit back indicator is used to accomplish transactions for a fractional amount of a pseudo cash unit. When the pseudo cash unit is returned to the money source, it is accompanied by a credit back indicator, and the returning party is then paid a fractional amount of the fixed monetary value assigned to the pseudo cash unit. A record adjuster deactivates the record associated with the pseudo cash unit to prevent multiple payments, but the remainder can still be recovered through use of a user identifier which is stored with the record which was generated for the pseudo cash unit.

Accordingly, it is a primary object of the present invention to provide an improved payment system suitable for use on the Internet which allows buyers and sellers to conduct cash back transactions with pseudo cash units.

This and further objects and advantages will be apparent to those skilled in the art in connection with the drawings and the detailed description of the preferred embodiment set forth below.

DETAILED DESCRIPTION OF THE PREFERRED EMBODIMENTS

Figure 1:
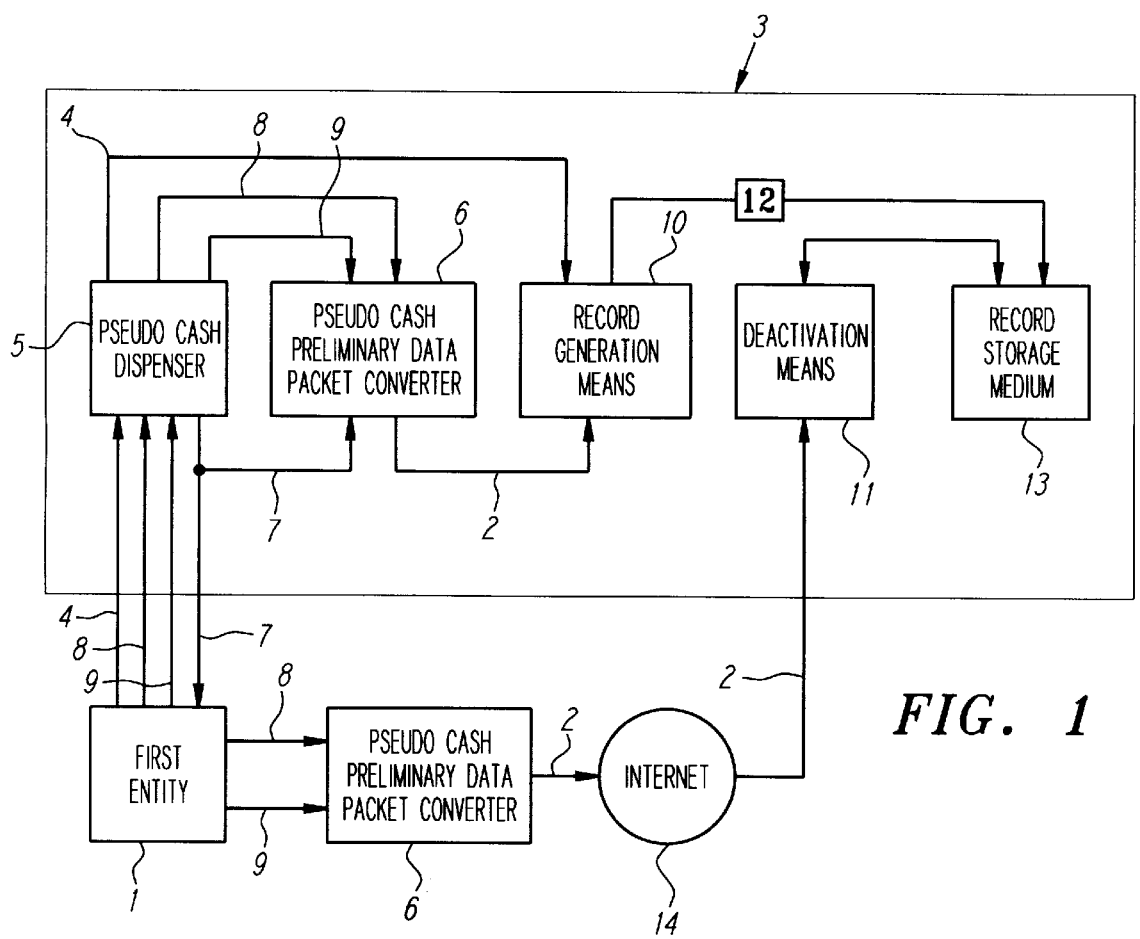
FIG. 1 is a schematic drawing depicting a system and method for conducting commerce on the Internet with a credit card according to the present invention.

The present invention is an extension of the SPECTA system disclosed in U.S. application Ser. No. 08/720,785 filed on Oct. 3, 1996 as referred to earlier. The SPECTA system enables pseudo cash transactions to be conducted on the Internet by relying upon pseudo cash units generated by insertion of user keys into pseudo cash preliminary data packets in accordance with user insertion keys through the use of an algorithm.

FIG. 1 depicts a system and method for providing totally anonymous pseudo cash transactions on the Internet with additional security for the first entity. In this system and method, the first entity 1 provides the user key 8 and the user insertion key 9, along with the fixed monetary value 4, to the pseudo cash repository 3 and receives the pseudo cash preliminary data packet 7 from the pseudo cash repository 3 by the pseudo cash dispenser 5. When the first entity wishes to spend the pseudo cash preliminary data packet 7, the first entity 1 uses the pseudo cash preliminary data packet converter 6 to generate the pseudo cash unit 2.

Ordinarily the pseudo cash preliminary data packet is issued with a face value of a convenient round number of dollar units, like 10, 20, 50 or 100. When the first entity issues a pseudo cash unit to a merchant for the purchase of goods or services on the Internet with a face value of a round number of dollars, the amount might be more than the value of the goods or services received. The present invention permits the first entity to recover the difference in value from the Money Source. This is done by attaching a credit back indicator to a pseudo cash unit generated with a suffix ".NNNN" where "N" is a numerical digit from "0" to "9". Without this attachment to the pseudo cash, the latter has a value exactly equal to its face value. With the attachment ".NNNN", the value of the pseudo cash becomes NN.NN% of the face value of the pseudo cash. Thus when the merchant sends the pseudo cash of the first entity to the Money Source for verification, the Money Source will credit back the difference, or (100−NN.NN)% of the face value of the pseudo cash to the account of the first entity.

Accordingly, it will be readily apparent to those skilled in the art that still further changes and modifications in the actual concepts described herein can readily be made without departing from the spirit and scope of the invention as defined by the following claims.

What is claimed:

1. A system for providing pseudo cash transactions, comprising:
    a pseudo cash dispenser for dispensing a pseudo cash preliminary data packet in exchange for a fixed monetary value;
    a pseudo cash data packet converter for inserting a user key into the pseudo cash preliminary data packet through the use of a user insertion key to generate a pseudo cash unit;
    a pseudo cash repository for maintaining a record of the pseudo cash unit and the fixed monetary value; and
    a record generator for generating the record from the pseudo cash preliminary data packet, the fixed monetary value, the user key and the user insertion key in response to an exchange of the preliminary data packet to a first entity for the fixed monetary value;
    a record adjuster for exchanging a second fixed monetary value for receipt of the pseudo cash unit with a credit back indicator and deactivating the record, said second fixed monetary value being less than the fixed monetary value.

2. A system as recited in claim 1, wherein the record adjuster adjusts the record associated with the pseudo cash unit to reflect an adjusted fixed monetary value to be associated with the pseudo cash unit which is equal to or less than the fixed monetary value less the second fixed monetary value.

3. A system as recited in claim 1, wherein the record maintained by the pseudo cash repository also includes a user identifier.

4. A system as recited in claim 3, further comprising means for allowing the first entity to recover the adjusted fixed monetary value through use of the user identifier.

5. A system as recited in claim 1, wherein the second fixed monetary value is derived from the fixed monetary value through use of the credit back indicator.

6. A method for providing pseudo cash transactions, comprising:
    generating a pseudo cash preliminary data packet;
    generating a pseudo cash unit from the pseudo cash preliminary data packet by inserting a user key of a first entity into the pseudo cash preliminary data packet in accordance with an algorithm that uses the user insertion key of the first entity;
    assigning a fixed monetary value to the pseudo cash unit;
    dispensing the pseudo cash preliminary data packet from a pseudo cash dispenser to the first entity in exchange for the fixed monetary value received from the first entity;
    creating a file in a pseudo cash repository which contains the pseudo cash unit and the fixed monetary value;
    regenerating the pseudo cash unit from the pseudo cash preliminary data packet by inserting the user key of the first entity into the pseudo cash preliminary data packet in accordance with the algorithm that uses the user insertion key of the first entity;
    exchanging the pseudo cash unit with a credit back indicator for a second fixed monetary value that is less than the fixed monetary value; and
    deactivating the file in the pseudo cash repository when the pseudo cash unit is exchanged for the fixed monetary value.

7. A method for providing pseudo cash transactions as recited in claim 6, comprising the additional step of:
    deriving the second fixed monetary value from the fixed monetary value through use of the credit back indicator.

8. A method for providing pseudo cash transactions as recited in claim 1, wherein the file includes a user identifier associated with the first entity.

9. A method for providing pseudo cash transactions as recited in claim 8, comprising the additional step of:
    permitting the first entity to recover the adjusted fixed monetary value through use of the user identifier.

* * * * *